United States Patent [19]

Jones

[11] 3,776,454

[45] Dec. 4, 1973

[54] DATA SUPPORTS FOR NUMERICAL DATA

[76] Inventor: Lloyd Leslie Llewellyn Jones, 36 Primrose Ct., 159 Hydethorpe Rd., London S.W. 12, England

[22] Filed: Aug. 18, 1970

[21] Appl. No.: 64,702

[30] Foreign Application Priority Data

Sept. 12, 1969 Great Britain .................. 45,220/69

[52] U.S. Cl. ................ 235/61.12 R, 340/146.3 A, 340/146.3 Z

[51] Int. Cl. ......................... G06r 1/00, G06r 19/06

[58] Field of Search ............................ 283/1, 7, 18; 235/61. 12 N, 61.12, 61.12 R, 12 R, 61.12 M, 235/61.12 C; 340/146.3 A, 146.3, 336, 146.3 A, 146.3 Z

[56] References Cited

UNITED STATES PATENTS

| | | | |
|---|---|---|---|
| 3,171,021 | 2/1965 | Jonker | 235/61.12 R |
| 3,176,271 | 3/1965 | Mader | 340/146.3 MA |
| 3,184,712 | 5/1965 | Holt | 340/146.3 MA |
| 3,197,736 | 7/1965 | Leightner et al. | 340/146.3 MA |
| 2,963,220 | 12/1960 | Kosten | 340/146.3 A |
| 3,485,168 | 12/1969 | Martinson | 340/146.3 A |

FOREIGN PATENTS OR APPLICATIONS

| | | | |
|---|---|---|---|
| 1,024,923 | 4/1966 | Great Britain | 340/336 |

*Primary Examiner*—Thomas A. Robinson

*Attorney*—Burns, Doane, Swecker and Mathis

[57] ABSTRACT

A data support such as a card or tape has a data-receiving surface delineated with rectangular digit areas in each of which a decimal digit can be recorded. Each digit area is delineated by a dark rectangular frame printed on the data-receiving surface, the area of the surface within the frame being subdivided into an array of elementary square areas arranged in three columns each of five elementary areas. Predetermined ones of the elementary areas, the second and fourth in the middle column, of each digit area are pre-recorded by overprinting with dark ink. By subsequently similarly recording in selected ones of the remaining elementary areas in a digit area any one of the 10 decimal digits may be represented in visually recognisable form.

5 Claims, 2 Drawing Figures

Lloyd L. L. Jones Inventor

By P. H. Smolka His Attorney

DATA SUPPORTS FOR NUMERICAL DATA

This invention relates to a data support for numerical data, such as a card or tape on which data may be recorded for subsequent processing in a computing machine.

It is an object of the invention to provide data support on which numerical data can be recorded in a form recognisable to the human eye and which can be read directly by a suitable reading device.

Accordingly, the present invention provides a data support, such as a card or tape, in which a surface of the support is delineated with rectangular digit areas in each of which a decimal digit can be recorded, each digit area is subdivided into an array of identical elementary areas each constituting a unitary recording area, and predetermined ones of the elementary areas of each digit area are prerecorded in a visually recognisable manner, so that by similarly recording in selected ones of the remaining elementary areas in a digit area any one of the 10 decimal digits may be represented in visually recognisable form in the digit area.

In a preferred form of the invention, the surface of the support is of a light colour and each digit area is delineated by a dark, rectangular frame printed on such surface, the area of the surface within the frame being subdivided into an array of elementary square areas arranged in three columns each of five elementary areas.

Suitably, the recording on an elementary area in a visually recognisable manner is achieved by rendering such area dark and the second and fourth elementary areas of the middle column in each digit area are overprinted in dark ink so that the remaining unprinted elementary areas in a digit area represent the decimal figure "8" in stylised form.

This preferred form of the invention finds particular application as a data support on which data may be recorded manually using a suitable marking instrument by rendering dark the requisite number of unprinted elementary areas in a digit area so as to leave unprinted areas defining, in a visually recognisable form, the decimal digit to be recorded in such digit area.

A reading device for reading the data on a data support according to the invention suitably comprises a photo-electric scanner for scanning the elementary areas of a digit area and producing a signal significant of whether an elementary area has received a recording, and a discriminator having an input connected to receive the signals from the scanner and operative to analyse the group of signals corresponding to the elementary areas of a digit area to determine the decimal digit recorded in such digit area, such discriminator producing an output signal significant of the decimal digit thus determined.

BRIEF DESCRIPTION OF DRAWING

The invention will now be described in more detail, by way of example only, with reference to the appended drawing, in which.

DESCRIPTION OF PREFERRED EMBODIMENT

Figure 1:
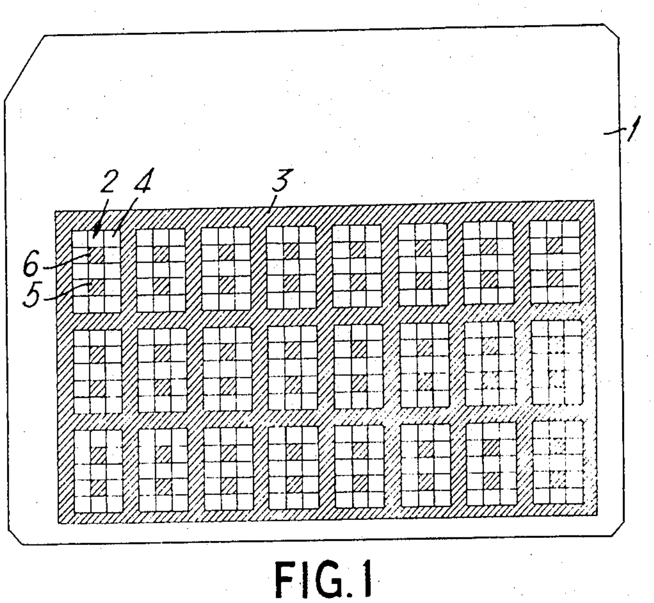
FIG. 1 illustrates a data card with a set of 24 digit areas thereon.

Referring to FIG. 1, an exemplary data card 1 for receiving numerical data has its surface delineated with rectangular digit areas 2, in each of which a single decimal digit may be recorded. The surface of the card 1 is white and the digit areas 2 are defined by a frame 3 printed on the card surface in dark ink. The frame 3 defines three rows each comprising eight digit areas 2 making a total of 24 digit areas. The area of the card surface within each digit area 2 is divided by a grid of fine lines into an array of square elementary areas 4 arranged in three columns each of five elementary areas.

Each digit area has two of its elementary areas 5 and 6, namely the second and fourth elementary areas of the middle column, overprinted in dark ink, so that the unrecorded elementary areas represent the decimal digit "8" in visually recognisable stylised form.

Figure 2:
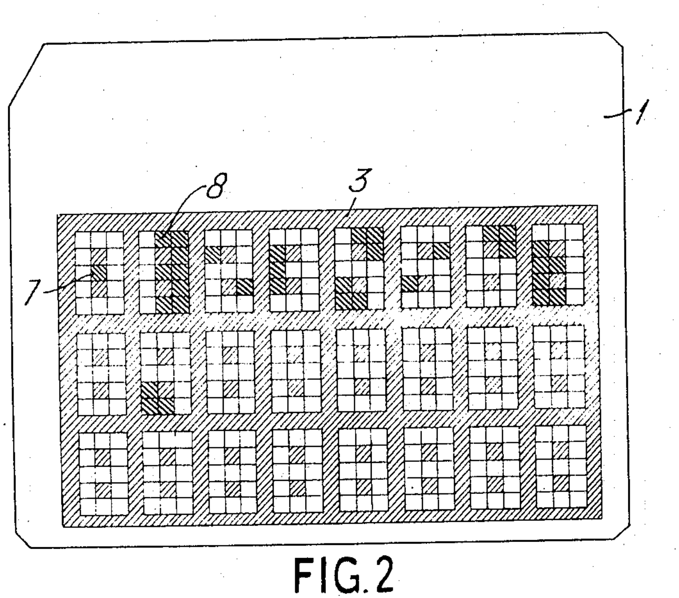
FIG. 2 shows how the decimal digits "0" to "9" may be obtained by filling in selected unprinted elementary areas.

Recording of a digit in a digit area on the card is carried out manually, using a suitable marking instrument such as a felt-tipped pen, by rendering dark appropriate ones of the 13 unprinted elementary areas as illustrated in FIG. 2. In the case of decimal digit "8", no further elementary areas need to be darkened, whilst varying numbers of elementary areas need to be darkened to represent the digits "0" to "7" and "9". For example, to represent the digit "0" only the third elemntary area 7 of the middle column of a digit area need be darkened, whereas for the digit "1" eight elementary areas such as elementary area 8 need to be darkened. The average number of elementary areas to be rendered dark per decimal digit is 3.4 using the stylised form of decimal digits shown in FIG. 2. Although it is possible to form the decimal digits in different stylised forms, the form shown in FIG. 2 has been found most satisfactory when it comes to determining which digit is represented by an imperfectly filled in digit area.

A suitable reading device for reading a data card as described above comprises means for feeding a card stepwise past a photo-electric scanner, for example an infra-red scanner, arranged to determine whether each elementary area of a digit area is light or dark. The output of the scanner is fed to a discriminator for analysing a group of signals corresponding to the elementary areas of a digit area to determine the decimal digit represented by such group of signals. The discriminator perferably includes logical circuitry controlled by a programme to perform the necessary analysis. Alternatively, the discriminator may have its function specifically built into its logical circuitry, but this is less desirable since it involves a larger number of components for the construction of the logical circuitry. The discriminator produces an output signal corresponding to the decimal digit detected in suitable form for subsequent processing by a computing machine.

The above described embodiment of data card has the following advantages.

The card may be filled in manually and read directly by a suitable reading device thus obviating the need for transferring the data to, for example, a conventional punch card. A low cost system is thereby provided.

Even allowing for the stylised form of the digits and the fact that no two people will ever make marks of precisely the same shape and size, the discipline imposed by the layout of the card is more likely to result in oversize record marks than undersized ones and the reading device for reading the card can be programmed to be tolerant of this.

The numerals recorded on the card are instantly recognisable by the human eye as the decimal digits which they represent.

The digits are more easily formed negatively, i.e., by rendering dark the unwanted parts of the figure "8" in a digit area then positively, i.e., by making marks in the form of the digit being entered.

Finally, it will be appreciated that the present invention may be combined with an existing system such as a system using punched holes, where it would be convenient to have part of the information entered manually in visually recognisable form and the rest of the information entered as punched holes. In such a case, a data support with provision for punched holes and manually recordable areas could be provided and used in conjunction with a suitable reading device able to read out data in either form.

I claim:

1. A data support, such as a card or tape, including a surface delineated with rectanglar digit areas in each of which a decimal digit can be recorded, each digit area being subdivided into an array of three columns of identical elementary areas, each column containing five elementary areas each constituting a unitary recording area, and predetermined ones of the identical elementary areas of each digit area being prerecorded in a visually recognisable manner, so that by similarly recording in selected ones of the remaining elementary areas in a digit area each and any one of the ten decimal digits may be represented through actual depiction of said each and any digit in visually recognisable form by the unrecorded elementary areas in the digit area.

2. A data support according to claim 1, in which the surface of the support is of a light colour and each digit area is delineated by a dark, rectangular frame printed on the surface of the support, each elementary area being square.

3. A data support according to claim 2, in which the recording on an elementary area in a visually recognisable manner is achieved by rendering such area dark, the second and fourth elementary areas in the middle column in each digit area being overprinted in dark ink so that the remaining unprinted elementary areas in a digit area represent the decimal figure "8" in stylised form.

4. A data support according to claim 3, in the form of a rectangular card having a data-receiving surface provided with three rows each of eight digit areas.

5. A method for recording a decimal digit on a data support in a machine readable and visually recognisable form comprising the steps of:

providing a data support delineated with a plurality of rectangular digit areas each subdivided into an $m \times n$ array of identical elementary areas, where $m$ and $n$ represent integers greater than one, each elementary area constituting a unitary recording area and with predetermined ones of said elementary areas prerecorded in a visually recognisable manner; and, similarly recording selected ones of the remaining elementary areas of one of said plurality of digit areas until the remaining unrecorded elementary areas visually depict an actual decimal digit selected from the decimal digits 0 – 9.

* * * * *